(No Model.)
Z. E. COFFIN.
DUMP CART.
No. 494,670. Patented Apr. 4, 1893.
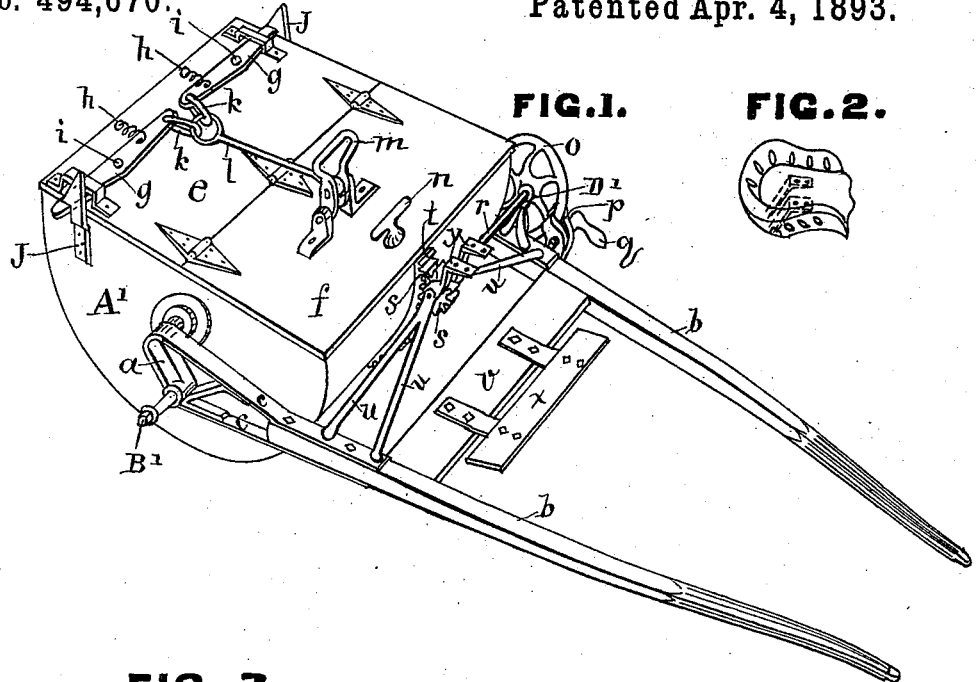
FIG. 1.
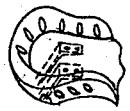
FIG. 2.
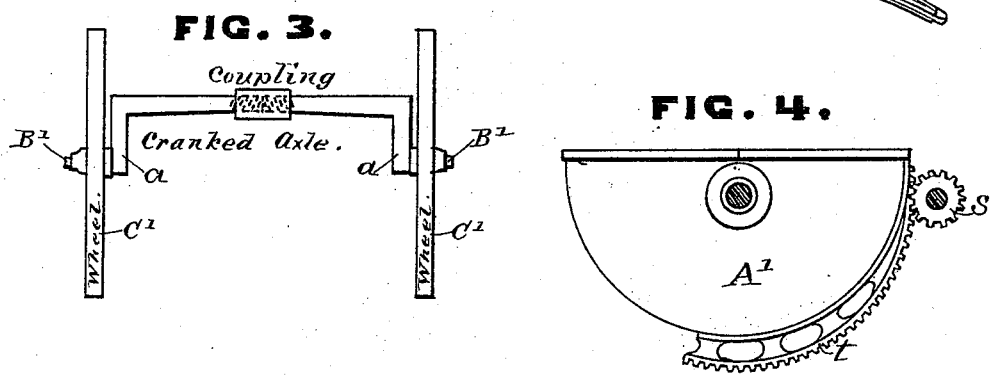
FIG. 3.
FIG. 4.
FIG. 5.
WITNESSES.
H. W. Sprague
L. F. Fountain
INVENTOR.
Z. E. Coffin
per D. N. B. Coffin Atty

UNITED STATES PATENT OFFICE.

ZEBULON ERASTUS COFFIN, OF BOSTON, MASSACHUSETTS, ASSIGNOR TO JOHN FOX, OF NEW YORK, N. Y.

DUMP-CART.

SPECIFICATION forming part of Letters Patent No. 494,670, dated April 4, 1893.

Application filed February 27, 1892. Serial No. 423,097. (No model.)

*To all whom it may concern:*

Be it known that I, ZEBULON ERASTUS COFFIN, of Boston, county of Suffolk, and State of Massachusetts, have invented certain new and useful Improvements in Dump-Carts; and the following is a full and exact description of the same, reference being had to the accompanying drawings, and to the letters of reference thereon, all of which comprise a part of this specification.

The nature of my invention relates to the construction of the cart without any ordinarily constructed frame, the axle on which the body is supported and upon which as a fulcrum it is made to tilt being united by means of a loop strap directly to each of the two shafts. The tilting cart body is also provided with a hinged lid, controlled in the opening and closing by a hand lever pivoted to the body which by means of connections unfastens and opens the lid by one and the same continued movement. Also to the means of operating and controlling the dumping movements of the cart body, and the various devices for simplifying the entire construction as well as the operation of the cart.

Referring to the drawings Figure 1. is a perspective view of the cart, the seat for driver and the wheels, being omitted the better to show other parts. Fig. 2. is a perspective view of the driver's seat. Fig. 3. is an elevation showing the wheels and cranked axle. Fig. 4. is a side elevation showing the cart body and the segmental gear attached and the pinion which meshes into and works the segmental gear. Fig. 5. is an elevation, side view, of the shaft axle and connecting loop strap.

The cart body is marked A. It is mounted pivotally upon the cranked axle *a*. This axle is preferably in two parts, each part extending to the middle of the body and there coupled to its mate by means of a right and left threaded screw coupling. It is provided with suitable bearings, one in each side of the body, and these bearings should be suitably packed to prevent leakage outward through them of any liquid which might be loaded into the cart body. Outside of the body the axle is cranked or bent downward and forward in an oblique direction and at the lower forward extremity is provided with ordinary "axle ends" and nuts to receive and retain the wheels.

Instead of a frame usually provided for a cart, the shafts for the horse or other moving power, are connected directly to the cranked ends of the axle. This connection is preferably made by means of a strap or band of iron or steel enveloping the crank end of the axle as appears in Figs. 1 and 5 which strap band or bar is properly bolted to the crank end and to the shaft. A brace *d* as shown may be placed between the upper and lower parts of this connection and bolted in, and its lower end may be utilized as a retaining piece against the crank end to assist the bolts in holding it firmly in place within the looped connection. The shafts should be connected to each other by means of a cross connection as V in Fig. 1. On this connection may be placed the driver's foot board as shown in Figs. 1 and 5.

On the cart body is bolted a segmental gear *t* which should be concentric with the axle. Into this segmental gear plays the pinion S. Pinion S is keyed to a common shaft with hand wheel O, or a substitute crank if preferred. This shaft *r* is supported in suitable bearings as *u, u,* D′, which have their support in the shafts or any suitable part attached thereto.

Any suitable locking device as screw clamps *q. p.* may serve to hold the hand wheel at any point of adjustment desired.

The driver's seat may be mounted on rods *y.* extending from bearings *u. u.* or other connections to the shafts. See Figs. 1 and 2.

The front portion of the cart body is represented as permanently covered and this covering serves to support a pivoted lever *m.* easily accessible to the driver, from this lever extends a connection to the two latches *g. g.* these latches are pivoted at *i i* upon a hinged cover occupying the rear portion of the top of the cart body and by means of the catches *j* fastened upon the sides of the body serve to lock down the cover, the springs *i* serving to draw them into locking contact as shown in Fig. 1. When it is desired to unlock the latches releasing them from catches $j$ and opening the hinged cover, the driver has only to pull forward and bear down to the cover the lever $m$. where the button $n$ enters the opening in the lever handle and a quarter turn of the button $n$ secures it and holds the cover open till released again by turning the button back. When this is done the cover can be lowered back again to its closed position by means of the lever, and the springs $h$ cause the latches to interlock with catches $j$ whereby the cover is secured again in the closed position.

When the cover has been opened as above described and it is desired to dump the contents of the cart body the driver or other operator releases the clamps $p$. $q$. and turns the hand wheel $o$. and attached shaft $r$. and pinion $s$. so tilting the cart body on its axis in the axle and so allowing the contents to flow out after which reversing the movement the cart body is brought back to its normal position, then closing the cover by means of lever $m$ as above described.

I claim—

1. The combination of the straps or connections $c, c$, connection $v$, the shafts and centrally coupled cranked axle as a dump cart body carrying device.

2. In a dumping cart the combination of the semicircular bottomed body journaled upon the cranked axle, said axle, the loop straps $c$ embracing both the cranks and the shafts, substantially as and for the purpose set forth.

3. The cranked and rigidly screw coupled half axles journaled in the sides of a tilting cart body in combination with said body, the wheels and shaft connections substantially as shown and described.

4. The combination of the two pivoted latch levers $g$ $g$ two catches $j$ $j$ with which they engage, the hinged lid and cart body to which they are respectively attached, the rod $l$ and links $k$ or equivalent connection to hand lever $m$, said lever which is pivoted to the top, and whose movement toward the driver's seat first disengages latches $g$ from catches $j$, and whose continued movement to a depressed position lifts the lid, and which is provided with the retaining button $n$ for holding the lid open, substantially as and for the purpose set forth.

5. In a dump cart for controlling more perfectly at all points the dumping and return movements of the body, the combination of the body segmental gear, pinion, its shaft, hand wheel and friction clamp acting directly upon said hand wheel to control the movement of said gears substantially as described.

6. In a dumping cart for controlling the dumping and return body movement at all points, the combination of the curved rack and pinion, and the friction clamp and hand wheel, operating together, substantially as described.

7. In a dump cart the combination of the friction hand wheel brake, the pinion connected thereto, segmental gear, shafts and wheel axle having the body journaled thereon, substantially as described.

8. The combination of the friction clamp, hand wheel for operating the body, pinion connected thereto cart body and the dumping journaled wheel axles, substantially as and for the purpose of controlling the body movements at all points of the dumping process substantially as described.

ZEBULON ERASTUS COFFIN.

Witnesses:
D. N. B. COFFIN,
H. N. SHELDON.